US012504797B2

(12) United States Patent
Lim et al.

(10) Patent No.: US 12,504,797 B2
(45) Date of Patent: Dec. 23, 2025

(54) THERMAL MANAGEMENT SYSTEMS FOR ELECTRONIC DEVICES AND RELATED METHODS

(71) Applicant: Intel Corporation, Santa Clara, CA (US)

(72) Inventors: Min Suet Lim, Penang (MY); Jeff Ku, Taipei (TW); Fern Nee Tan, Penang (MY); John Lang, Portland, OR (US); Kavitha Nagarajan, Bangalore (IN); Javed Shaikh, Bengaluru (IN); Deepak Sekar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 726 days.

(21) Appl. No.: 17/712,010

(22) Filed: Apr. 1, 2022

(65) Prior Publication Data

US 2022/0300048 A1    Sep. 22, 2022

(51) Int. Cl.
| | |
|---|---|
| G06F 1/20 | (2006.01) |
| G06F 1/16 | (2006.01) |
| H01L 23/373 | (2006.01) |
| H05K 1/02 | (2006.01) |
| H05K 7/20 | (2006.01) |

(52) U.S. Cl.
CPC ............ *G06F 1/203* (2013.01); *G06F 1/1626* (2013.01); *H01L 23/3735* (2013.01); *H05K 1/0203* (2013.01); *H05K 7/20409* (2013.01)

(58) Field of Classification Search
CPC .... G06F 1/1601; G06F 1/1626; G06F 1/1637; G06F 1/1656; G06F 1/203; G06F 1/206; G06F 3/041; G06F 2200/201; H05K 7/20; H05K 7/20154; H05K 7/20209; H05K 7/20336; H05K 7/2039; H05K 7/20409; H05K 7/20436; H05K 7/20463; H05K 7/205; H05K 7/20509; H05K 7/20963; H05K 1/0203; H05K 1/0209; B32B 7/12; B32B 2264/108; B32B 2307/302; B32B 2457/208
See application file for complete search history.

(56) References Cited

U.S. PATENT DOCUMENTS

| | | | |
|---|---|---|---|
| 10,551,886 B1 * | 2/2020 | de la Fuente | ...... H05K 7/20963 |
| 12,284,793 B2 * | 4/2025 | Bawa | ........................ F28F 3/12 |
| 2003/0066638 A1 * | 4/2003 | Qu | .......................... F22B 21/00 |
| | | | 257/E23.11 |

(Continued)

*Primary Examiner* — Amir A Jalali
(74) *Attorney, Agent, or Firm* — Hanley, Flight & Zimmerman, LLC

(57) ABSTRACT

Thermal Management Systems for electronic devices and related methods are disclosed. An example electronic housing includes a housing defining a cavity, electronics in the cavity, and a touch display over the electronics. A heat spreader has a first surface toward the electronics and a second surface opposite the first surface toward the touch display, where the heat spreader is to dissipate heat generated by the electronics. A glass cover is coupled to the housing and has a first side toward the touch display and a second side opposite the first side, where the glass cover is exposed external to the housing. An insulation layer is between the second surface of the heat spreader and the second side of the glass cover to restrict heat transfer from the electronics to the second side of the glass cover.

21 Claims, 12 Drawing Sheets

(56) References Cited

U.S. PATENT DOCUMENTS

| | | | |
|---|---|---|---|
| 2004/0113549 A1* | 6/2004 | Roberts | H05B 33/04 257/E23.087 |
| 2011/0069255 A1* | 3/2011 | Choi | G02B 6/0088 349/63 |
| 2013/0240189 A1* | 9/2013 | Huang | H10F 71/00 165/185 |
| 2015/0218877 A1* | 8/2015 | Kawahara | B32B 7/05 428/34 |
| 2016/0183414 A1* | 6/2016 | Huang | H01L 23/373 361/709 |
| 2017/0038806 A1* | 2/2017 | Prajapati | G05B 15/02 |
| 2017/0277235 A1* | 9/2017 | Delano | H05K 7/20427 |
| 2018/0039308 A1* | 2/2018 | Moore | G06F 1/206 |
| 2018/0073245 A1* | 3/2018 | Kim | B32B 27/322 |
| 2018/0157297 A1* | 6/2018 | Delano | H01L 21/4871 |
| 2018/0235073 A1* | 8/2018 | Ma | H05K 7/2039 |
| 2019/0132993 A1* | 5/2019 | Sutherland | H05K 5/0086 |
| 2020/0058968 A1* | 2/2020 | Thompson | H01M 10/653 |
| 2021/0247147 A1* | 8/2021 | Tain | F28F 3/14 |
| 2021/0259134 A1* | 8/2021 | Uppal | H01L 23/10 |
| 2021/0303043 A1* | 9/2021 | Lee | H05K 7/20972 |
| 2025/0113467 A1* | 4/2025 | Whitehead | H05K 7/20209 |

* cited by examiner

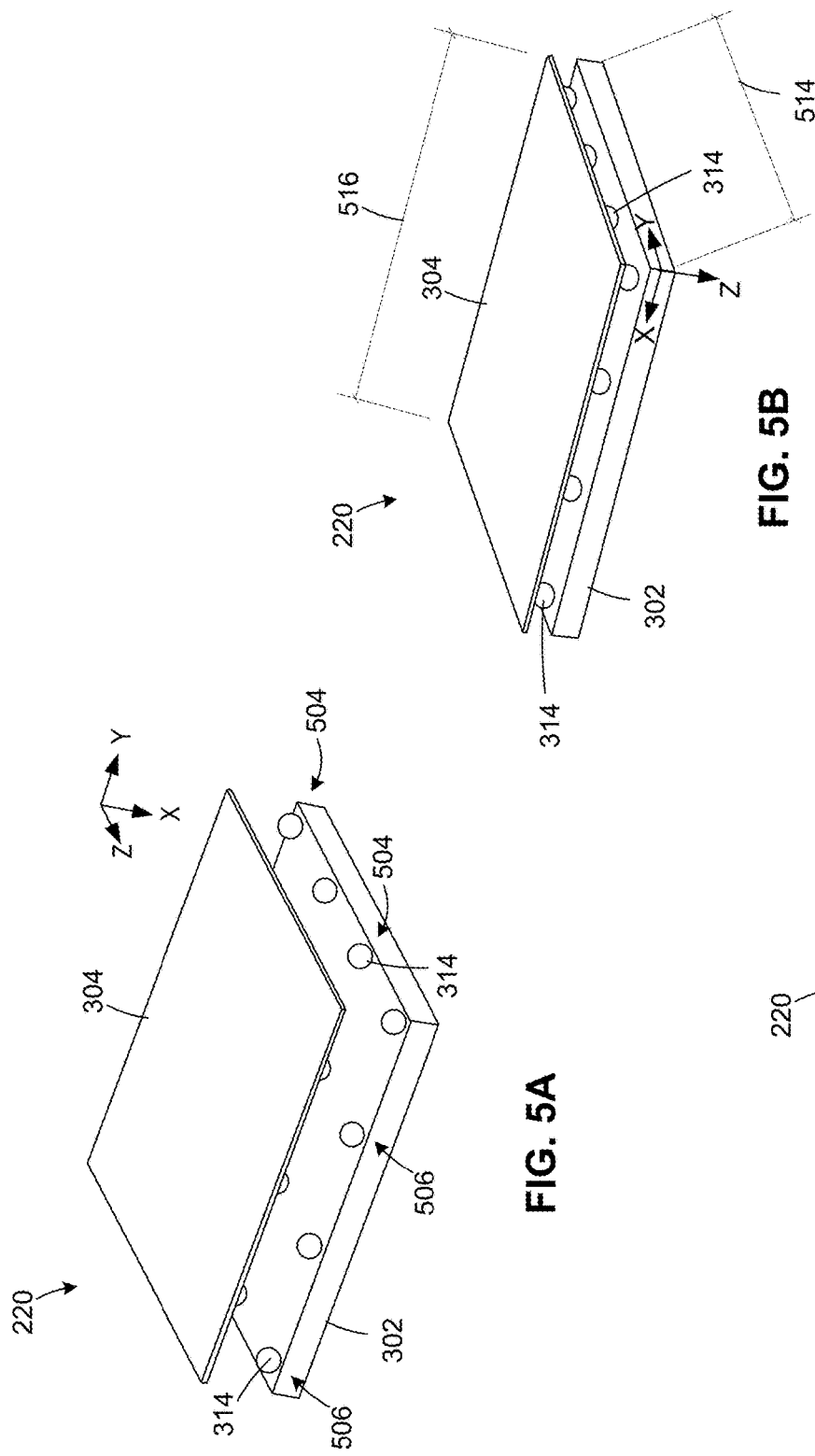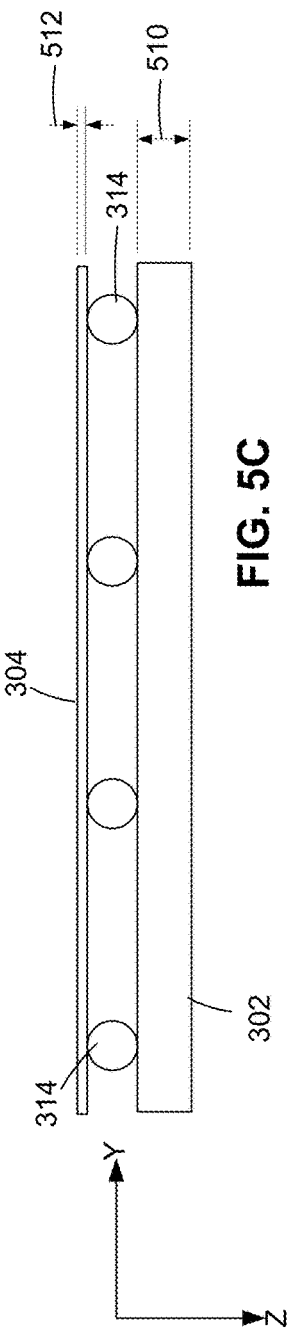
FIG. 5A
FIG. 5B
FIG. 5C

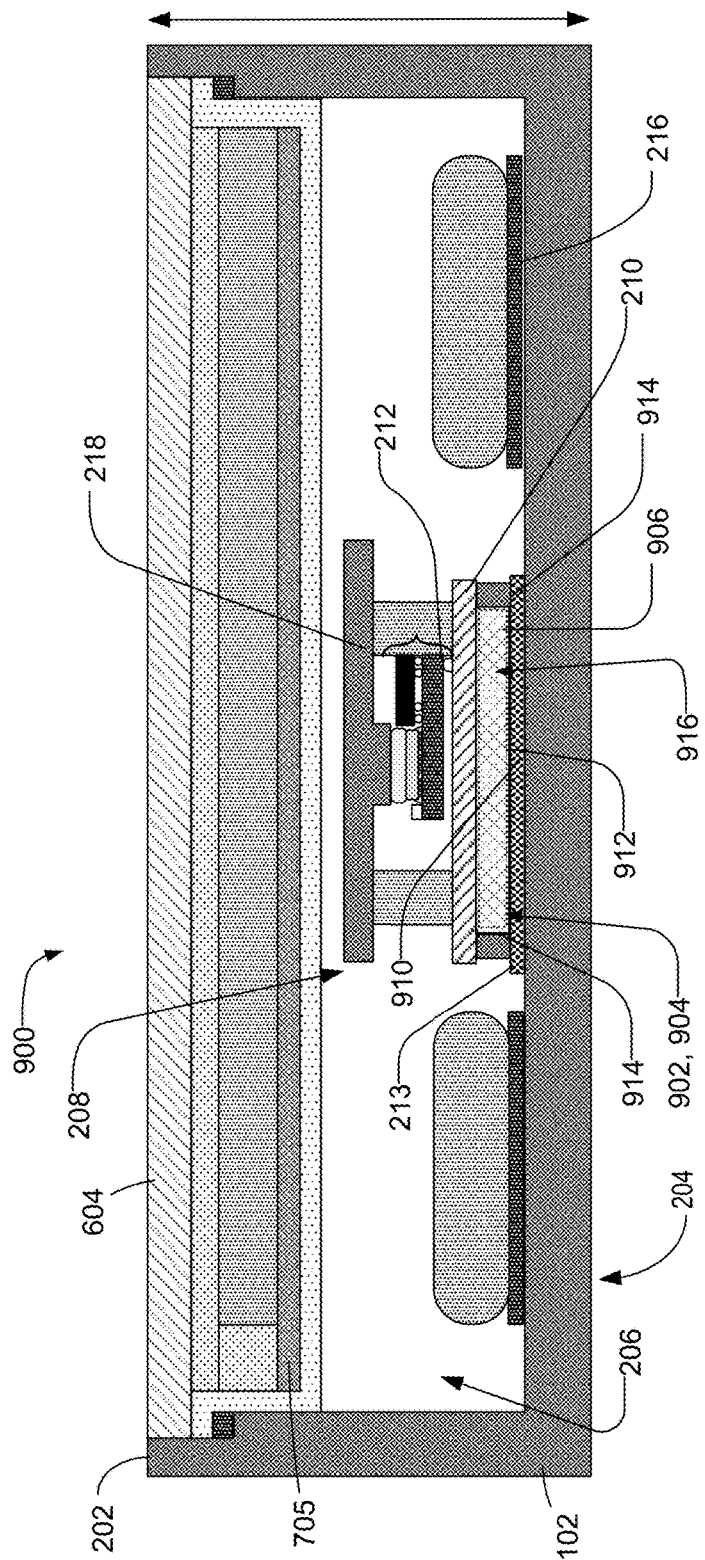
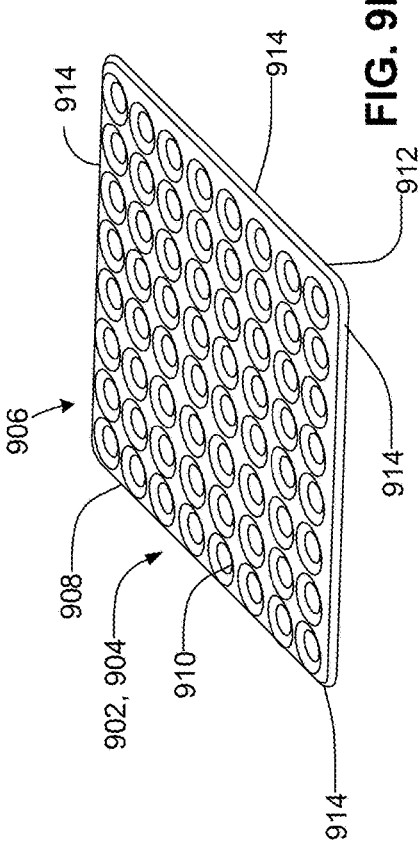
FIG. 9A
FIG. 9B

THERMAL MANAGEMENT SYSTEMS FOR ELECTRONIC DEVICES AND RELATED METHODS

FIELD OF THE DISCLOSURE

This disclosure relates generally to electronic devices, and, more particularly, to thermal management systems for electronic devices and related methods.

BACKGROUND

Electronic devices employ thermal systems to manage thermal. To manage thermal conditions, electronic devices employ thermal cooling systems that cool electronic components of the electronic devices during use.

BRIEF DESCRIPTION OF THE DRAWINGS

FIG. 5A is a partially exploded view of an example glass cover assembly of the example electronic device of FIGS. 1-4.

FIG. 5B is a perspective view of the example glass cover assembly FIG. 5A.

FIG. 5C is a side view of the example display FIGS. 5A and 5B.

FIG. 9A is a cross-sectional view of another example electronic device disclosed herein.

FIG. 9B is a perspective view of another example thermal management system of the example electronic device of FIG. 9A.

Figure 1:
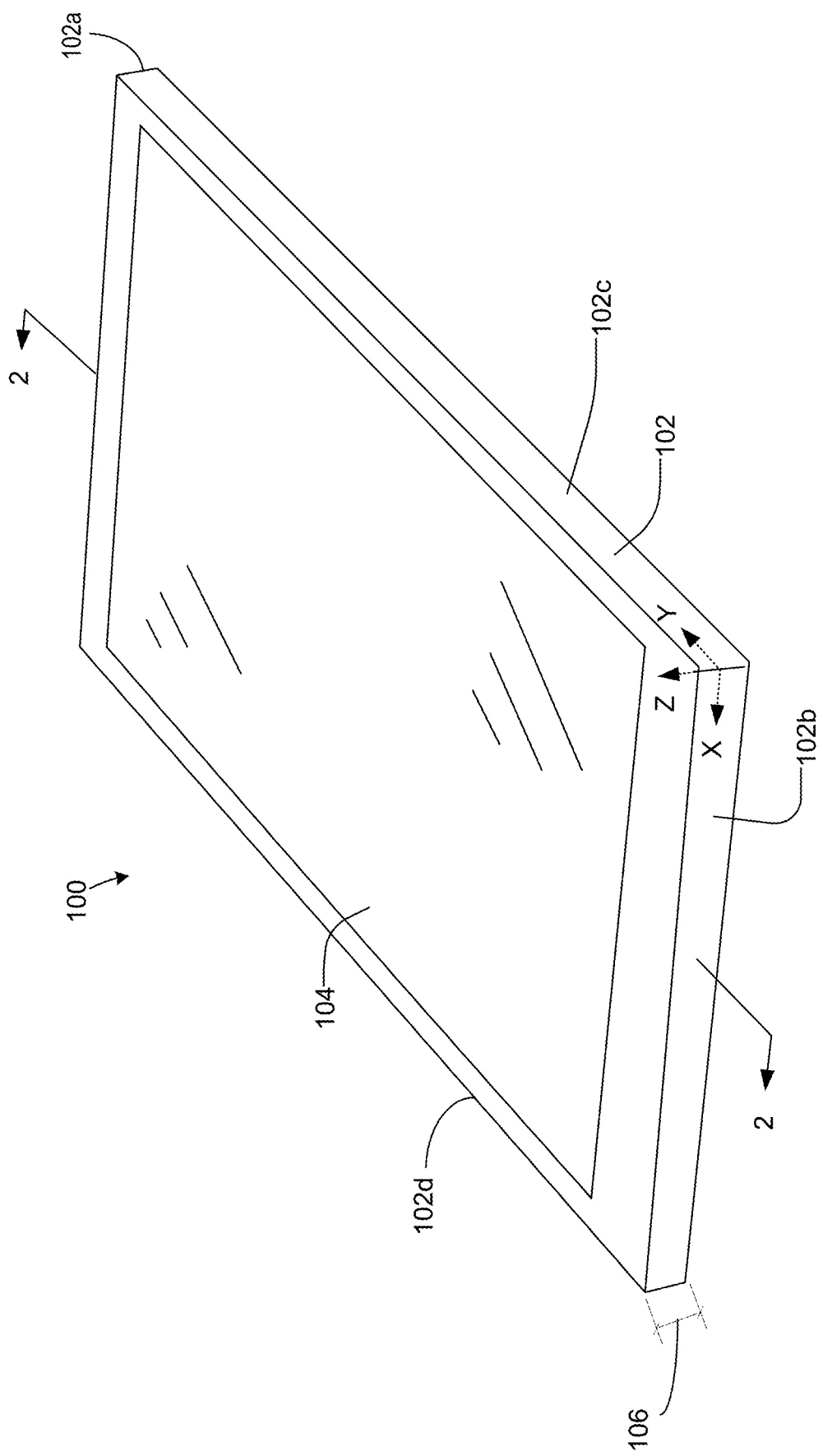
FIG. 1 is an example electronic device having an example thermal management system constructed in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. For example, the dimensions may be within a tolerance of plus or minus ten percent (+/−10%).

DETAILED DESCRIPTION

During operation of an electronic device (e.g., a laptop, a tablet, etc.), hardware components disposed in a body or housing of the device, such as a processor, graphics card, analog and/or digital circuits, and/or battery, generate heat. Heat generated by the hardware components of the electronic device can cause a temperature of one or more electronic components to exceed operating temperature limits of the one or more electronic components. In some instances, heat generated by the electronic device can cause portions of an exterior surface, or skin, of a device housing or a touch screen (e.g., glass) of a display to increase and become warm or hot to a user's touch.

To prevent overheating of the hardware components, damage to the device, and/or discomfort to the user of the device when the user touches or places one or more portions of the user's body proximate to the skin of the device and/or components of the device accessible via the exterior surface of the housing such as a touchpad, the electronic device includes a thermal management system to dissipate heat from the electronic device. Example thermal systems include active cooling systems or passive cooling systems.

Active cooling systems employ forced convection methods to increase a rate of fluid flow, which increases a rate of heat removal. For example, to exhaust heat or hot air generated within the body of the electronic device and cool the electronic device, active cooling systems often employ external devices such as fans or blowers, forced liquid, thermoelectric coolers, etc. However, active cooling systems require additional space requirements and/or use of electricity, which results in a larger housing form factor and/or higher manufacturing costs.

Passive cooling systems employ natural convection and heat dissipation by utilizing heat spreaders or heat sinks to increase (e.g., maximize) radiation and convection heat transfer. For instance, passive cooling systems do not employ external devices such as fans or blowers that would otherwise force airflow to exhaust heat from the housing of the electronic device. Instead, passive cooling systems relay on material characteristic(s) to provide heat transfer pathways between electronic components and outer surfaces or skins and/or displays of the electronic devices. Passive cooling systems are significantly less expensive than active cooling systems, do not require power to operate, and provide space saving benefits. However, touch screen displays and/or other display or glass covers can also absorb heat. In some examples, such passive cooling systems can inadvertently direct heat dissipated from the electronic devices to a glass cover of a touch screen display, thereby increasing a temperature of the display or glass cover and becoming warm or hot to a user's touch during operation.

To reduce a surface temperature (e.g., skin temperature) of an electronic device, some known electronic devices provide a large air gap between a vapor chamber or heat sink coupled to electronics such as, for example, a processor (e.g., a heat spreader of an integrated circuit package) and/or a display assembly (e.g., a back plate of the display assembly). For instance, some 12 inch touch display or tablets include an air gap or approximately 0.8 millimeters in a stack up direction (e.g., a z-direction or vertical direction) to reduce a skin temperature of a glass cover of a display assembly to be less than 45 degrees Celsius. However, such an air gap increases an overall dimensional thickness of the electronic device. For instance, some known overall dimensional thickness values of electronic devices having an air gap greater than 0.8 millimeters are greater than 6.7 millimeters thick. Reduction of the overall dimensional thickness of a housing of an electronic device, requires a reduction of a stack-up dimension of system components and/or reduction of the air gap between the system components and the back plate. However, reducing the air gap for smaller form factor devices (e.g., devices having an overall thickness of 6.2 millimeters) causes the surface temperature (e.g., skin temperature) of the glass cover to increase greater than a target temperature of 45 degrees Celsius. Thus, reducing an air gap between a thermal conductive structure (e.g., a vapor chamber) and a glass cover or display assembly increases a surface temperature of the glass cover and increasing the air gap between a thermal conductive structure (e.g., a vapor chamber) and a glass cover or display assembly increases an overall dimensional height or overall thickness of a housing of an electronic device, thereby increasing its form factor.

Example apparatus disclosed herein employ passive thermal management systems to reduce an overall thickness of a housing of an electronic device (e.g., by reducing an air gap between a thermal conductive structure (e.g., a vapor chamber) and a glass cover or display assembly) to accommodate smaller form factors while reducing a surface temperature (e.g., a skin temperature) of a display assembly or glass cover (e.g., to be less than 45 degrees Celsius). To reduce the overall thickness of a housing to provide a smaller form factor without increasing a skin temperature experienced by a glass cover assembly, example thermal solutions disclosed herein employ an insulation layer. Example insulation layers disclosed herein can include vacuum and/or gas (e.g., a low thermal conductivity gas). Specifically, example insulation layers disclosed herein provide a skin cooling benefit to reduce a temperature of a surface of a housing or glass (e.g., a glass cover) of an electronic device. In addition to reducing heat transfer (e.g., improve thermal solution) and/or skin temperatures, example insulation layers disclosed herein enable housings or electronic devices to have low profile form factors. An example insulation layer disclosed herein can be formed in a glass cover of an electronic device, formed between a display assembly and a back plate supporting the display assembly. An example insulation layer can be formed within a cavity of a housing of an electronic device. An example insulation layer can be formed within a cavity between a printed circuit board (e.g., a motherboard) and a heat spreader or chassis. An example insulation layer can be formed within a vacuum pad or vacuum structure (e.g., an insert) and can be positioned between any component of an electronic device including, but not limited to, a glass cover and an OCA (optically clear layer), a display assembly and a back plate, a motherboard and a thermal spreader, and/or between any other desired components. In some examples, an example electronic device disclosed herein includes a housing defining a cavity, a system component assembly positioned in the cavity, where the system component assembly includes a circuit board and a heat spreader to interface with the housing, a display, a glass cover positioned on the display, and an insulation layer positioned between at least one of the glass cover and the display, the display and a display heat shield, the display heat shield and a housings, or between the circuit board and the heat spreader. As used herein, a "vacuum" means a pressure that is less than ambient atmospheric pressure.

FIG. 1 illustrates an example electronic device 100 constructed in accordance with teachings of this disclosure. The electronic device 100 of the illustrated example is a personal computing device such as, for example, a tablet. The electronic device 100 of the illustrated example includes a housing 102 and a display assembly 104. The housing 102 defines a first side wall 102a, a second wall 102b, a third side wall 102c and a fourth side wall 102d. The housing 102 includes an overall thickness 106 (e.g., a form factor height). The housing 102 houses one or more electronic components and carries the display assembly 104. In some examples, the display assembly 104 includes a touch screen. In some examples, the display assembly 104 includes a first display and a second display (e.g., a dual display system). To enable user inputs, the display assembly 104 of the illustrated example provides a graphical user input device, a virtual keyboard, a virtual trackpad, etc. Although the example electronic device 100 of the illustrated example is a tablet, in some examples, the electronic device 100 can be a laptop, a desktop, a mobile device, a cell phone, a smart phone, a hybrid or convertible PC, a personal computing (PC) device, a sever, a modular compute device, a digital picture frame, a graphic calculator, a smart watch, and/or any other electronic device that employs passive cooling. In some examples, the tablet can interface with a detachable keyboard (e.g., a physical keyboard), a detachable display and/or any other electronic device.

Figure 2:
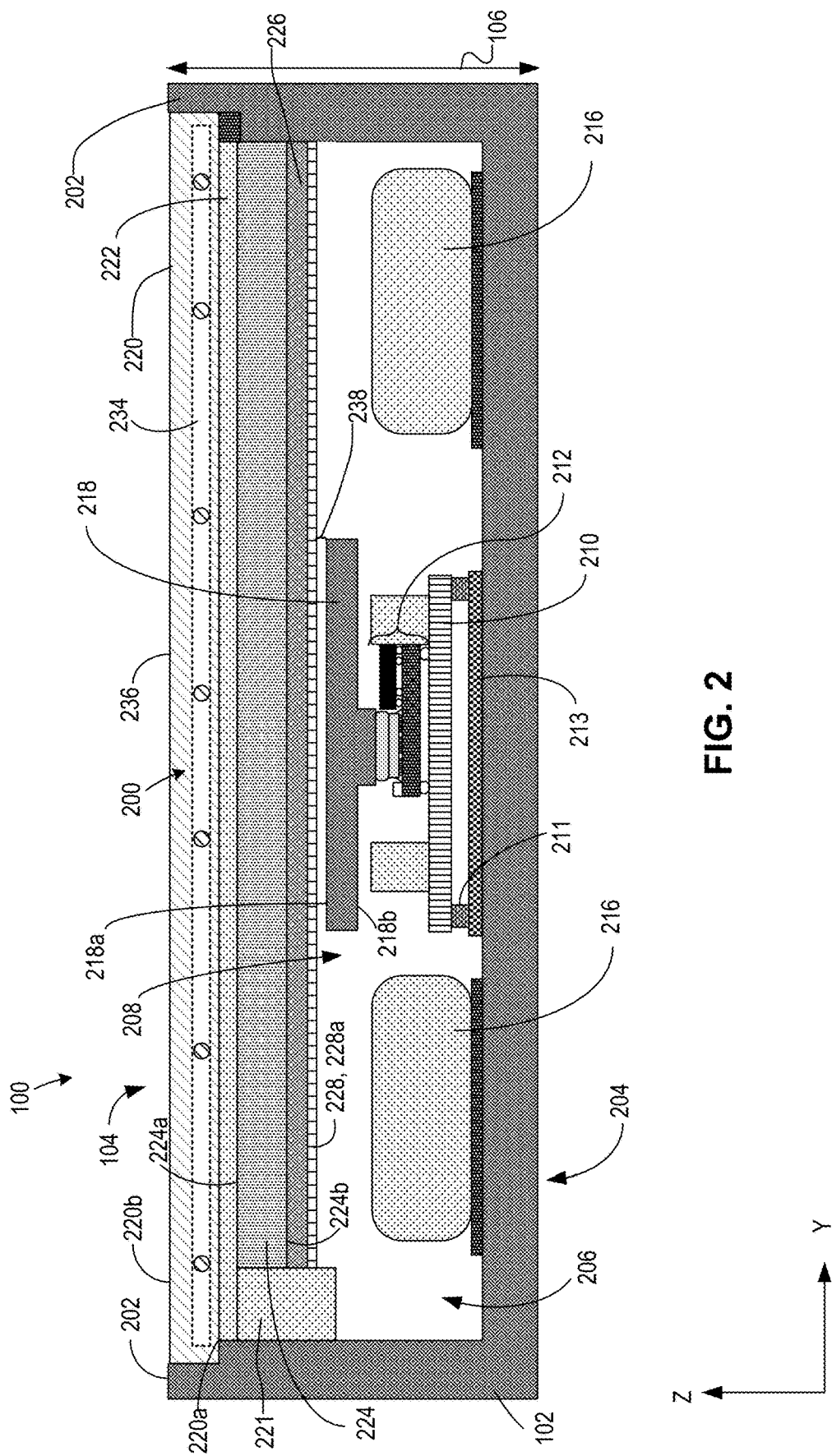
FIG. 2 is a cross-sectional view of the example electronic device of FIG. 1 taken along line 2-2 of FIG. 1.

FIG. 2 is a side cross-sectional view of the example electronic device 100 of FIG. 2 taken along line 2-2 of FIG. 1 and showing an example thermal management system 200 disclosed herein. The housing 102 defines a cavity 206 to receive one or more hardware components including a system component assembly 208. The housing 102 (e.g., a chassis) of the illustrated example includes a frame 202. The frame 202 of the illustrated example includes a skin 204 (e.g., a bottom skin, an outer skin, a D-cover, etc.) defining an outer surface of frame 202. In some examples, the skin 204 can be integral to the frame 202. In other examples, the skin 204 is a separate structure from the frame 202. In some such examples, the skin 204 and/or the display assembly 104 of the illustrated example attaches to the frame 202 via a chemical fastener such as an adhesive (e.g., glue), plastic welding, and/or other liquid fastener. In some such examples, the skin 204 of the illustrated example is attached to the frame 202 via mechanical fasteners such as, for example, a screw, a clip, a rivet, and/or any other suitable fastener(s). In some examples, the skin 204 can be integrally formed with the frame 202 (e.g., the skin may be a unitary structure that wraps around some or all of the frame 202). The frame 202 and/or the skin 204 of the illustrated example can be composed of plastic, magnesium, aluminum, a combination thereof, and/or any other material(s).

The housing 102 of the illustrated example carries the system component assembly 208. The system component assembly 208 of the illustrated example include a printed circuit board (PCB) 210 coupled to electronics including a semiconductor package containing logic circuitry such as a semiconductor package 212 and/or a system on chip (SOC) or processor. The PCB 210 is coupled to a ring backplate 211 (e.g., a pillar). The ring backplate 211 of the illustrated example is coupled to a heat spreader 213 (e.g., a graphite plate, a second heat spreader) to spread heat generated by the PCB 210 to the housing 120 (e.g., the skin 204 and/or the frame 202). The electronic device 100 of the illustrated example includes one or more battery packs 216 positioned in the cavity 206 of the housing 102. The hardware components can also include a graphics card, light emitting diodes, a speaker, a microphone, a camera, memory, a storage drive, WIFI antenna, cellular antenna, etc.

To dissipate or spread heat generated by the hardware components such as the system component assembly 208 during operation of the electronic device 100, the electronic device 100 of the illustrated example employs a heat sink or heat spreader 218 (e.g., a vapor chamber, a copper plate, a first heat spreader). The heat spreader 218 of the illustrated example is a heat sink that includes a metal enclosure that is vacuum sealed and includes an internal wick structure attached to the inside walls of the enclosure that moves liquid around the heat spreader 218 using capillary action to spread heat along a surface area (e.g., upper surface and a lower surface) of the heat spreader 218. In some examples, the heat spreader 218 is a planar heat pipe, which can spread heat in two dimensions (e.g., across a surface area of the vapor chamber). The heat spreader 218 of the illustrated example can be composed of brass, copper and/or any other suitable material(s) for transferring and/or spreading heat. The heat spreader 218 of the illustrated example is coupled to the PCB 210 (e.g., via fasteners, standoffs, etc.). The semiconductor package 212 of the illustrated example is positioned (e.g., sandwiched) between the PCB 210 and the heat spreader 218, and the heat spreader 218 is positioned between the semiconductor package 212 and the display assembly 104. In some examples, the electronic device 100 can employ a heat spreader, a heat sink, a heat pipe and/or any other heat spreading device in place of the heat spreader 218.

The display assembly 104 of the illustrated example is coupled or supported by the housing 102. The display assembly 104 of the illustrated example is supported by the frame 202 of the housing 102. The display assembly 104 of the illustrated example includes a glass cover 220, panel electronics 221, an optically clear adhesive (OCA) 222, a display 224 (e.g., a touch screen display), a back plate 226 (e.g., an LCD back plate), and a display heat shield 228. The display 224 and/or the display assembly 104 can include a polarizer (e.g., a front and rear polarizer), a digitizer, and/or any other devices, adhesive, layers, etc. The display 224 of the illustrated example is positioned between the back plate 226 and the OCA 222. The display heat shield 228 is positioned between the heat spreader 218 and the display 224. The OCA 222 is positioned between the glass cover 220 and the display 224. The glass cover 220 of the illustrated example is coupled to the OCA 222. Thus, in the illustrated example, a first side or surface 220a of the glass cover 220 is oriented toward a first surface 224a of the display 224 (e.g., opposite a second side or surface 224b) and a second side or surface 220b (e.g., an outer surface 236) of the glass cover 220 is oriented externally of the cavity 208 and/or the housing 202. The first side or surface 218a of the heat spreader 218 is oriented toward the display 224 and/or the glass cover 220 and a second side 218b of the heat spreader 218 opposite the first side 218a is oriented toward the electronic components 208 and/or the cavity 206 of the housing 104.

The glass cover 220 of the illustrated example includes an insulation layer 234. The insulation layer 234 of the illustrated example provides insulation to prevent or restrict heat from the electronic components (e.g., the semiconductor package 212, the PBC 210, the heat spreader 218, etc.) from dissipating or spreading to the outer surface 236 of the glass cover 220 and/or the display assembly 104. As a result of the insulation layer 234, a surface or skin temperature of the glass cover 220 does not exceed a threshold temperature (e.g., 44 degrees Celsius). In this manner, the insulation layer 234 and/or the display assembly 104 enables positioning or location of the display assembly 104 closer to the electronic components located in the cavity 206 (e.g., without affecting or increasing a target skin temperature of the glass cover 220). For example, an air gap 238 between an upper or outer surface 218a of the heat spreader 218 and a lower surface 228a of the display assembly 104 (e.g., a lower surface 228a of the display heat shield 228 in the z-direction) can be reduced.

For example, an electronic device structured as a 12 inch tablet enables the glass cover 220 to maintain a skin temperature of less than 44 degrees Celsius (e.g., approximately between 41 degrees Celsius and 43 degrees Celsius or less than 42.9 degrees Celsius). Additionally, the overall thickness 106 of the housing 102 of the illustrated example is approximately 6.2 millimeters. The air gap 238 (e.g., a space or air gap in the vertical direction in the orientation of FIG. 2) between the heat spreader 218 and the display heat shield 228 is approximately between 0.33 millimeters and 0.36 millimeters (e.g., 0.35 millimeters).

In comparison, a 12 inch tablet that includes a standard glass cover (e.g., without the insulation layer 234) typically generates a skin temperature of approximately 46 degrees Celsius when the air gap 238 is approximately 0.35 millimeters. Thus, to reduce the skin temperature to approximately 43 degrees Celsius, known electronic devices with standard glass covers require an air gap of approximately 0.8 millimeters, which increases an overall stack-up thickness (e.g., a thickness in the z-direction) of the frame to approximately 6.7 millimeters. Thus, the glass cover 220 of the illustrated example reduces skin temperature on the frame 202 and/or the glass cover 220, reduces the air gap 238 and/or reduces the overall thickness 106 of the housing 102. For example, the air gap 238 can be reduced or made smaller due to the insulation layer 234 compared to a gap (e.g., 0.8 millimeters) needed for an electronic device without an example insulation layer disclosed herein. As such, the overall thickness 106 of the example housing 102 of FIG. 2 is approximately 0.5 millimeters smaller than a housing of a prior art tablet.

Figure 3:
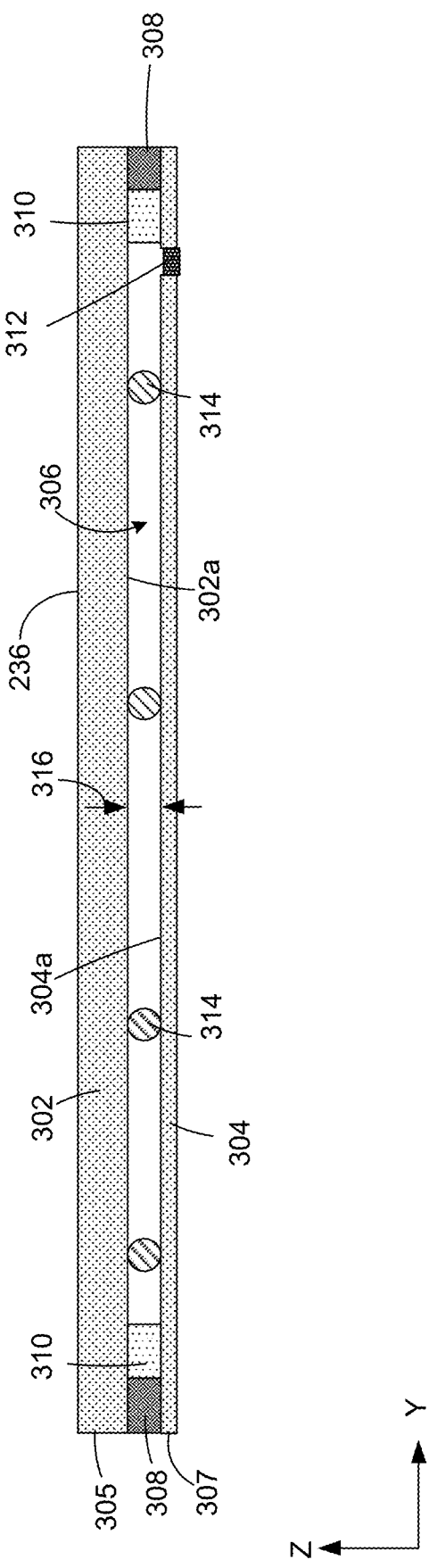
FIG. 3 is a cross-sectional side view of an example glass cover assembly of the example thermal management system of FIG. 2.

FIG. 3 a cross-sectional side view of the example glass cover 220 of FIG. 2. As shown in FIG. 1, the glass cover 220 has a rectangular shape. The glass cover 220 of the illustrated example includes a first glass 302 and a second glass 304 (e.g., a double layer glass cover). The first glass 302 is oriented toward a user of the electronic device (e.g., externally of the housing 102) and/or defines the outer surface 236 of the display assembly 104 and the second glass 304 is oriented toward the system components assembly 208 or cavity 206 (e.g., internally of the housing 102). The first glass 302 is spaced from the second glass 304 to define the insulation layer 234. The insulation layer 234 of the illustrated example defines a vacuum chamber 306 (e.g., a chamber, a gas-filled chamber, a cavity, etc.) between the first glass 302 and the second glass 304.

To seal the vacuum chamber 306, the glass cover 220 of the illustrated example includes an edge seal 308 (e.g., a rectangular shaped seal or gasket). Thus, the vacuum chamber 306 of the illustrated example is also defined by the edge seal 308 positioned about or along a perimeter edge of the first glass 302 and a perimeter edge of the second glass 304. In other words, the first glass 302, the second glass 304 and the edge seal 308 cooperate to define the vacuum chamber 306 of the insulation layer 234. The edge seal 308 of the illustrated example can be an epoxy, an elastomeric material, a rubber material, a metal, an alloy, and/or any other material to seal the vacuum chamber 306 between the first glass 302 and the second glass 304. Thus, the first glass 302 is coupled to the second glass 304 via the edge seal 308. In some examples, an adhesive (e.g., glue) or other bonding agent can be used to couple the first glass 302 and the second glass 304 to the edge seal 308. In some examples, respective perimeter edges 305, 307 of the first glass 302 and the second glass 304 can be insert molded with a frame or border, which seals the vacuum chamber 306. Thus, the perimeter edges 305, 307 of the first glass 302 and the second glass 304, respectively, are encased, enclosed or encapsulated by a frame (e.g., a rectangular frame) that surrounds the edges of the first glass 302 and the second glass 304. To absorb moisture in the vacuum chamber 306, a getter material 310 is positioned along a perimeter of the edge seal 308 and/or the first glass 302 and the second glass 304. For example, the getter material 310 can be a wicking material that absorbs moisture.

After the first glass 302 and the second glass 304 are coupled to the edge seal 308 and the vacuum chamber 306 is sealed, a vacuum is drawn in the vacuum chamber 306. To draw a vacuum in the vacuum chamber 306, the glass cover 220 of the illustrated example includes a port 312. The port 312 of the illustrated example is formed in the second glass 304. In some examples, the port 312 is a one-way valve including, but not limited to, an umbrella valve, a spring loaded check valve, a rubber check valve, a stopper, a plug, epoxy, and/or any other fluid control device or structure for maintaining and/or allowing access to the vacuum chamber 306. Thus, after the vacuum chamber 306 is fluidly sealed, a vacuum is drawn in the vacuum chamber 306 via the port 312. For example, the port 312 prevents airflow into the vacuum chamber 306 after a vacuum is drawn in the vacuum chamber 306. As used herein, a vacuum is a pressure that is less than atmospheric pressure. Thus, a pressure in the vacuum chamber 306 is less than atmospheric pressure (e.g., 14.7 pounds per square inch (psi)) when a vacuum is applied to the vacuum chamber 306.

To maintain a structural integrity of the first glass 302 and/or the second glass 304 when a vacuum is drawn in the vacuum chamber 306, the glass cover 220 of the illustrated example includes a plurality of spacers 314 (e.g., pillars, support structures, spheres, balls, etc.). The spacers 314 in the vacuum chamber 306 support at least one of the first glass 302 or the second glass 304 when less than atmospheric pressure is present in the vacuum chamber 306. The spacers 314 are positioned inside the vacuum chamber 306 and have a first portion in contact (e.g., direct contact) with an inner surface 302a of the first glass 302 and a second portion in contact (e.g., direct contact) with an inner surface 304a of the second glass 304. Each of the spacers 314 has a diameter that is substantially equal to a distance or gap 316 defined between the inner surface 302a of the first glass 302 and the inner surface 304a of the second glass 304. In some examples, a size or diameter of the spacer 314 can be small ranging between 5-7 um (micrometers). In the illustrated example, the spacers 314 are made of silica, resin, or other material(s) that can prevent the first glass 302 and/or the second glass 304 from buckling when a vacuum is applied to the vacuum chamber 306. Additionally, the spacers 314 of the illustrated example have a spherical shape. However, in some examples, the spacers 314 can be elongated strips, have square shapes, triangular shapes, and/or any other shape. Additionally, the spacers 314 of the illustrated example are composed of a transparent material (e.g., silica, see-through material, etc.).

Figure 4:
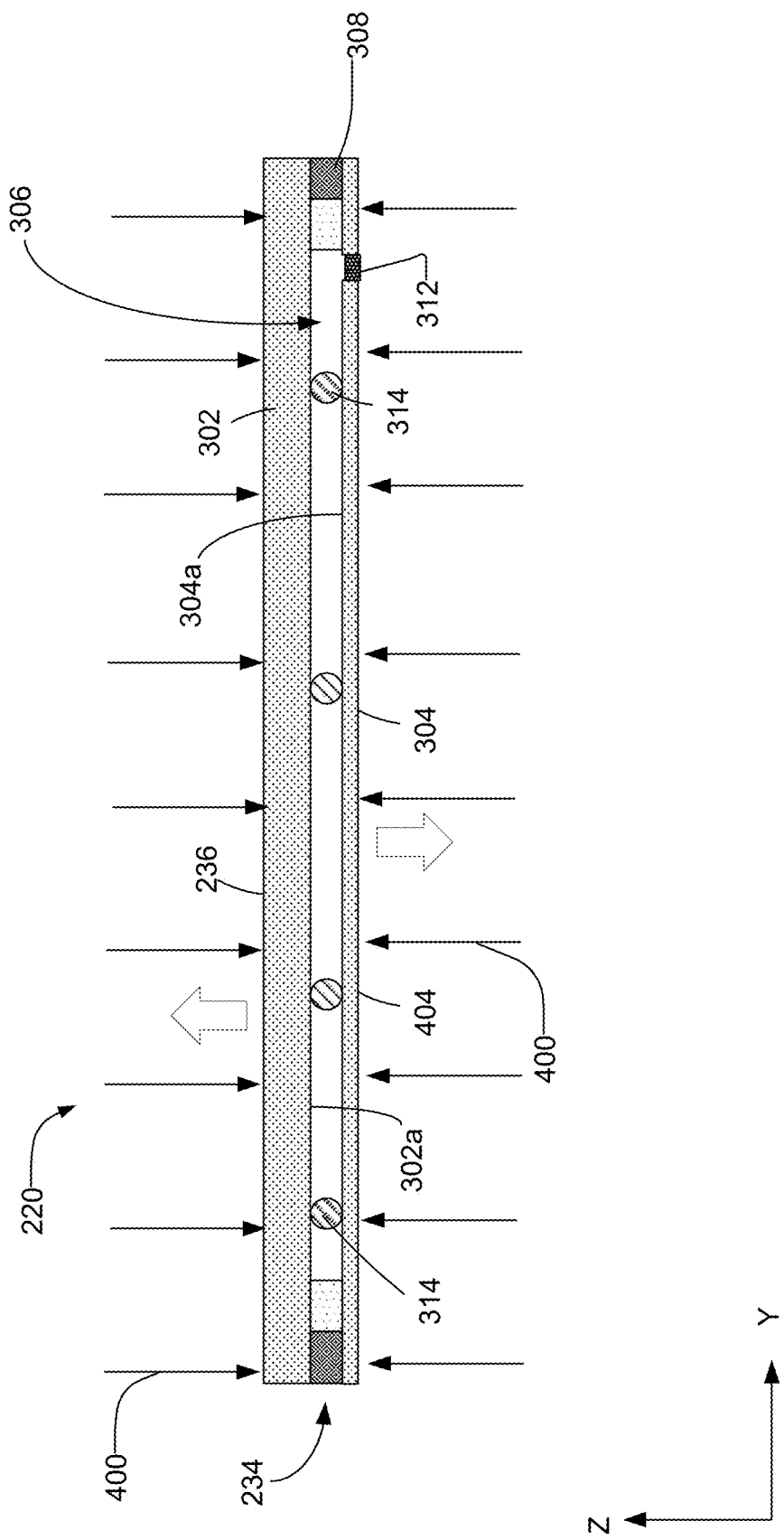
FIG. 4 is a cross-sectional side view of the example glass cover assembly of FIG. 3 but shown with schematic force vectors.

FIG. 4 is a cross-sectional side view similar to FIG. 3 but showing schematic force vectors 400 of atmospheric pressure. For example, the force vectors 400 from the atmospheric pressure are imparted to the outer surface 236 of the first glass 302 and an outer surface 404 of the second glass 304 (e.g., externally from the vacuum chamber 306). The port 312 and the edge seal 308 seal of the vacuum chamber 306 prevent atmospheric pressure from entering into the vacuum chamber 306. During operation, the thermal management system 200 provides a passively cooled system. For example, the insulation layer 234 prevents or reduces heat conduction and/or radiation due to lack of air, which reduces an overall skin temperature of the skin 204, the frame 202, the glass cover 220 (e.g., the first glass 302), other components and/or the housing 102. In other words, the vacuum defined within the vacuum chamber 306 prevents or reduces spreading of heat to the outer surface 236 of the first glass 302 (e.g. opposite the inner surface 302a), which reduces an overall skin temperature of the outer surface 236 of the first glass 302.

Additionally, the spacers 314 prevent the first glass 302 and/or the second glass 304 from collapsing or buckling due to a vacuum applied within the vacuum chamber 306. In other words, the spacers 314 prevent the first glass 302 and/or the second glass 304 from moving toward each other and/or collapsing when forces of the atmospheric pressure are exerted on the outer surface 236 of the first glass 302 and/or when atmospheric pressure is exerted on an outer surface 404 of the second glass 304 when a vacuum is exerted against the inner surfaces 302a, 304a of the first glass 302 and the second glass 304, respectively. Thus, the spacers 314 maintain the gap 316 between the inner surface 302a of the first glass 302 and the inner surface 304a of the second glass 304 (e.g., in the z-direction) after the vacuum is applied to the vacuum chamber 306.

Additionally, the insulation layer 234 of the glass cover 220 does not impact touch sensitivity and/or display functionality of the display 224. For example, the insulation layer 234 does conduct electricity. Even at low voltages, electricity can travel through a vacuum (e.g., the insulation layer 234, a perfect vacuum, etc.). In other words, changing the air medium to vacuum will not impact a touch sensitivity of the display 224. Additionally, the thermal and/or electrical conductivity from the spacers 314 is minimal and negligible. Thus, the spacers 314 do not interfere with an operation of the display assembly 104. In some examples, if needed, a recalibration on a touch point of the display 224 can be calibrated using existing image processing controllers.

FIG. 5A is a partially exploded view of the example glass cover 220 of FIGS. 2-4. FIG. 5B is a perspective view of the glass cover 220 of FIGS. 2-4. FIG. 5C is a side view of the example glass cover 220 of FIGS. 2-4. The edge seal 308 is not shown in the illustrated example for clarity. Referring to FIGS. 5A-5C, the spacers 314 of the illustrated example include a plurality of spherically-shaped structures (e.g., balls) positioned between the first glass 302 and the second glass 304. The spacers 314 are spaced in rows 504 and columns 506 (e.g., a 4×4 matrix). Thus, the spacers 314 of the illustrated example are positioned in a pattern. However, in some examples, the spacers 314 can be spaced randomly and/or in any other pattern(s). As noted above, the spacers 314 are translucent and do not affect an operation of the display 224.

The first glass 302 of the illustrated example has a first thickness 510 and the second glass 304 has a second thickness 512 (e.g., in a z-direction or vertical direction in the orientation of FIG. 5C). In the illustrated example, the first thickness 510 of the first glass 302 is greater than the second thickness 512 of the second glass 304. For example, the first thickness 510 is approximately 330 microns and the second thickness 512 is approximately 50 microns. However, in some examples, the first thickness 510 can be the same as the second thickness 512, or the second thickness 512 can be greater than the first thickness 510. The first glass 302 and the second glass 304 each have a length 514 and a width 516 in an x-y direction (e.g. a plane perpendicular to the z-direction), respectively. These dimensions can vary depending on a size of a display (e.g., 12 inch tablet, 7 inch, etc.). The spacers 314 can be made of Silica and can each have a diameter of 7 microns and each spacer spaced apart by 100 microns. In this example, the glass cover 220 includes approximately 2,500 spacers 314.

Alternatively, in some examples, instead of applying a vacuum in the vacuum chamber 306 (e.g., a negative pressure or a pressure less than atmospheric pressure), the vacuum chamber 306 can receive a gas (e.g., via the port 312) to provide a thermal insulation layer between the first glass 302 and the second glass 304. Thus, in such examples, the vacuum chamber 306 is defined as a gas-filled chamber. For example, a low thermal conductivity gas (e.g., Argon, Nitrous oxide, C02, Krypton, Xenon) can be used for thermal insulation between the first glass 302 and the second glass 304. Because a gas provided in the chamber 306 has a positive pressure and/or a pressure that is substantially equal to or greater than atmospheric pressure, employing a gas instead of a vacuum reduces or eliminates a vacuum pressure against the inner surfaces 302a and 304a that would otherwise be generated by applying a vacuum to the vacuum chamber 306. Thus, using a gas instead of a vacuum can eliminate structural components (e.g., the spacers 314) needed to maintain an integrity of the glass cover 220 when a vacuum is applied in the vacuum chamber 306 and atmospheric pressure is applied to surfaces external from the vacuum chamber 306. In other words, when employing a gas within the vacuum chamber 306 as a thermal insulation layer, supporting features (e.g., the spacers 314) between the first glass 302 and the second glass 304 can be removed (e.g., are not required), which can reduce manufacturing costs and/or facilitate manufacturing.

Below is an example table of thermal conductivity characteristic of different example low conductivity gasses that can be used to provide an insulation layer within the vacuum chamber 306 between the first glass 302 and the second glass 304.

TABLE 1

| Vacuum | 0 |
|---|---|
| Perlite, vacuum | 0.00137 |
| Xenon (gas) | 0.0051 |
| Krypton (gas) | 0.0088 |
| Carbon dioxide (gas) | 0.0146 |
| Nitrous oxide (gas) | 0.0151 |
| Argon (gas) | 0.016 |
| Air | 0.02 |
| NASBIS | 0.02 |
| Perlite | 0.03 |

FIGS. 6-12 illustrate other example electronic devices 600, 700, 800, 900, 1000, 1100, 1200 having other example thermal management systems 602, 702, 802, 902, 1002, 1102, 1202 disclosed herein. Many of the components of the example electronic devices 600, 700, 800, 900, 1000, 1100, 1200 of FIGS. 6-12 are substantially similar or identical to the components described above in connection with FIGS. 1-5. As such, those components will not be described in detail again below. Instead, the interested reader is referred to the above corresponding descriptions for a complete written description of the structure and operation of such components. To facilitate this process, similar or identical reference numbers will be used for like structures in FIGS. 6-12 as used in FIGS. 1-5. For example, each of the electronic devices includes a housing 102 that includes a frame 202 (e.g., a chassis) and a skin 204 (e.g., a bottom skin, an outer skin, a D-cover, etc.). The frame 202 and the skin 204 define a cavity 206 to receive one or more hardware components (e.g., a graphics card, a battery, light emitting diodes, a speaker, a microphone, a camera, memory, a storage drive, WIFI antenna, cellular antenna, etc. The electronic device 100 of the illustrated example includes one or more battery packs 216 positioned in the cavity 206 of the housing 102).

Figure 6:
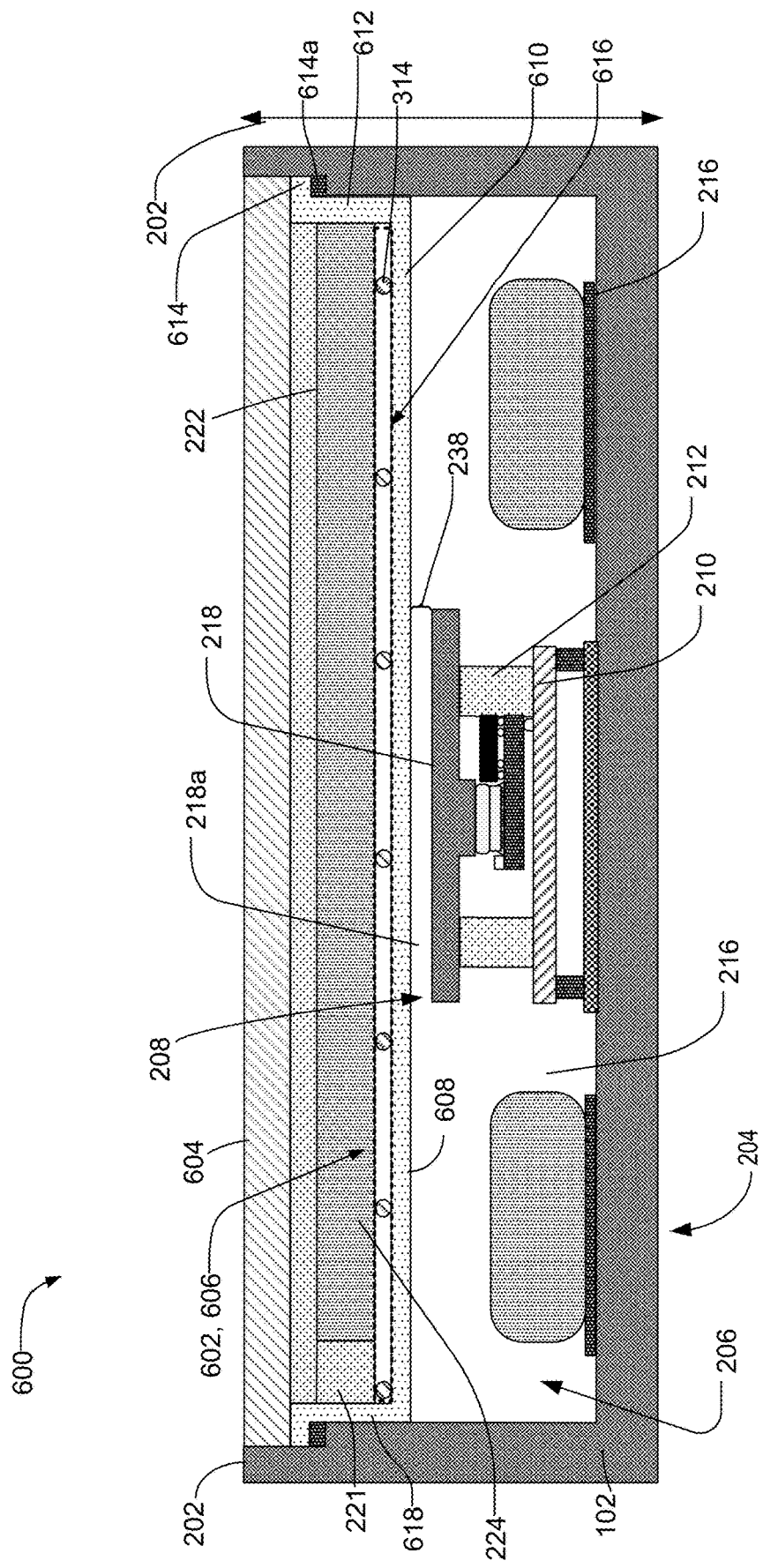
FIG. 6 is a cross-sectional view of another example electronic device disclosed herein.

FIG. 6 is a cross-sectional side view of the example electronic device 600 having the example thermal management system 602 disclosed herein. The electronic device of FIG. 6 includes a glass cover 604. In contrast to the glass cover 220 of FIGS. 1-5, the glass cover 604 is a single glass and/or does not include an insulation layer (e.g., a vacuum chamber 306). The thermal management system 602 of FIG. 6 includes an insulation layer 606 formed between a display 224 (e.g., a display assembly) and a display back plate 608. Specifically, the display back plate 608 of the illustrated example can be a thin glass or steel structure. For example, the display back plate 608 includes a lower wall 610 (e.g., a horizontal wall) and a side wall 612 (e.g., a vertical wall about a perimeter of the lower wall 610). The display back plate 608 of the illustrated example includes a flange 614 to couple (e.g., attach or support) the display back plate 608 and the housing 102. Thus, the display back plate 608 is suspended in the cavity 206 of the housing 102. The display 224 and the display back plate 608 form or define a vacuum chamber 616 between the display 224 and the display back plate 608 (e.g., schematically represented by a dashed rectangular line). In some examples, panel electronics 221 and/or an optically clear adhesive (OCA) 222 define at least a portion of the vacuum chamber 616. To provide support to the display 224 and/or the display back plate 608, the insulation layer 606 includes a plurality of spacers 314 (e.g., disposed in the vacuum chamber 616). In some examples, the display 224 (e.g., a display assembly) is bonded with a thin layer of stainless steel (e.g., SUS) or glass and then vacuumed. In some examples, the vacuum chamber 616 is sealed with epoxy, an edge seal, rubber, and/or any other material(s). To assembly the electronic device 600, the hardware components (e.g., the system component assembly 208) are positioned in the cavity 206 of the housing 102. The display back plate 608 is then coupled to the frame 202 via the flange 614. In some examples, a seal 614a (e.g., a gasket, a rubber pad, etc.) is provided between the flange 614 and the frame 202. The display 224 is assembled with the panel electronics 221, the OCA 222, and the glass cover 604 as a display subassembly. The display subassembly is then positioned in a recessed cavity 618 formed by the lower wall 610 and the side wall 612. The glass cover 604 is supported by the flange 614 of the display back plate 608. To provide the vacuum in the vacuum chamber 616, a substantial perimeter (e.g., three sides) of the glass cover 604 and flange 614 interface is sealed (e.g., via a sealant, epoxy, rubber, etc.), except for at least a small portion of the perimeter is left without a seal (e.g., a fourth side is not sealed). With the non-sealed portion providing access to the vacuum chamber 616, a vacuum is drawn in the vacuum chamber 616. The non-sealed portion of the perimeter of the glass cover 604 and the flange 614 interface is then sealed, maintaining a vacuum in the vacuum chamber 616. In operation, the thermal management system 602 provides a passively cooled system, (e.g., solely) heat conduction and/or radiation is occurred due to lack of air, which reduces skin temperature of the skin 204, the frame 202, the glass cover 604 and/or other components and/or the housing 102. In some examples, the vacuum chamber 616 can receive a low thermally conductive gas instead of a vacuum.

Figure 7:
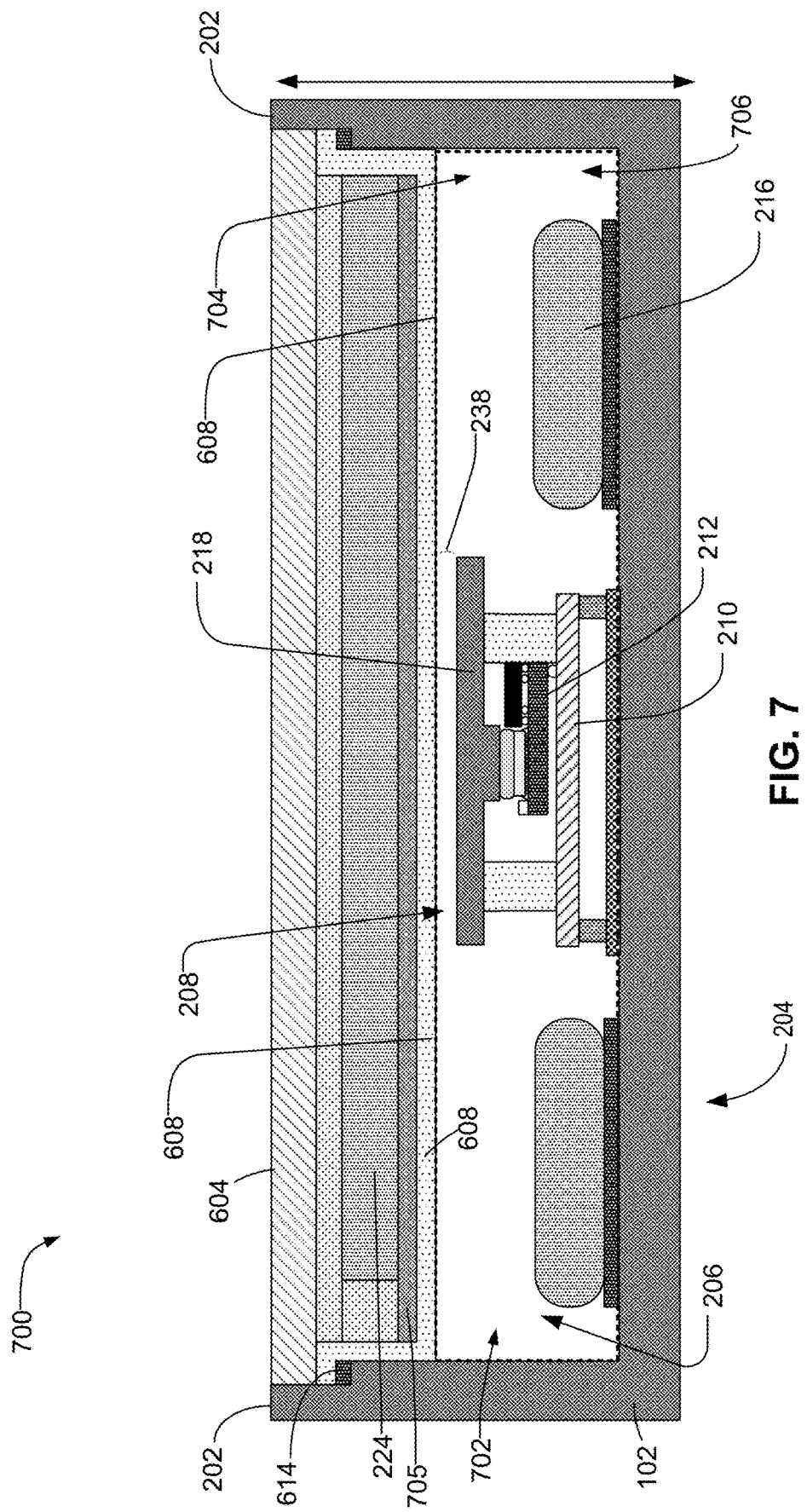
FIG. 7 is a cross-sectional view of another example electronic device disclosed herein.

FIG. 7 is a cross-sectional side view of the example electronic device 700 having the example thermal management system 702 disclosed herein. In the illustrated example, the thermal management system 702 includes an insulation layer 704 formed in a cavity 206 defined by the housing 102 (e.g., the frame 202) that receives system components assembly 208 (e.g., a PCB 210, a semiconductor package 212, a heat sink or heat spreader 218, the battery packs 216, etc.). Specifically, the housing 102 and a display back plate 608 (e.g., the back plate of FIG. 6) form a vacuum chamber 706 (e.g., schematically represented by a dashed rectangular line). In other words, the frame 202, the skin 204 and the display back plate 608 are sealed (e.g., via a gasket, getter material, epoxy, or other seal(s)) to define the vacuum chamber 706. In other words, the cavity 206 defined by the housing 102 is sealed to provide the vacuum chamber 706. In this manner, a vacuum or low thermally conductive gas is applied to the vacuum chamber 706 to define the insulation layer 704. In some examples, the vacuum chamber 706 receives a low thermally conductive gas instead of being vacuumed. To provide the vacuum, a substantially portion of a perimeter of a glass cover 604 and a flange 614 interface is sealed, leaving a portion of the perimeter of the interface unsealed. A vacuum is drawn in the vacuum chamber 706 via the unsealed portion of the interface. After the vacuum is drawn, the remaining portion of the glass cover 604 and the flange 614 interface is sealed to completely seal the vacuum chamber 706. Thus, the cavity 706 is sealed between the display back plate 608 (e.g., a surface) oriented toward the semiconductor package 208 and walls of the housing 102 (e.g., inner surfaces of the frame 202 and/or the skin 204) between the display back plate 608 and the housing 102. In some examples, the system component assembly 208 is assembled and bonded with a thin layer of SUS or glass and then vacuumed. In operation, the thermal management system 702 provides a passively cooled system, (e.g., solely) heat conduction and/or radiation is occurred due to lack of air, which reduces skin temperature of the skin 204, the frame 202, a glass cover 604 and/or other components and/or the housing 102. The electronic device 700 of the illustrated example includes a layer 705 between the display 224 and the display back plate 608. The layer 705 of the illustrated example is an insulation cushion layer and/or a cushion layer. For example, the layer 705 can be an insulation layer (e.g., a traditional insulation layer) that does not include a vacuum (e.g., less than atmospheric pressure) or a gas. However, in some examples, the layer 705 can include the insulation layer 602 of FIG. 6 and/or the insulation layer 234 of FIG. 2.

Figure 8:
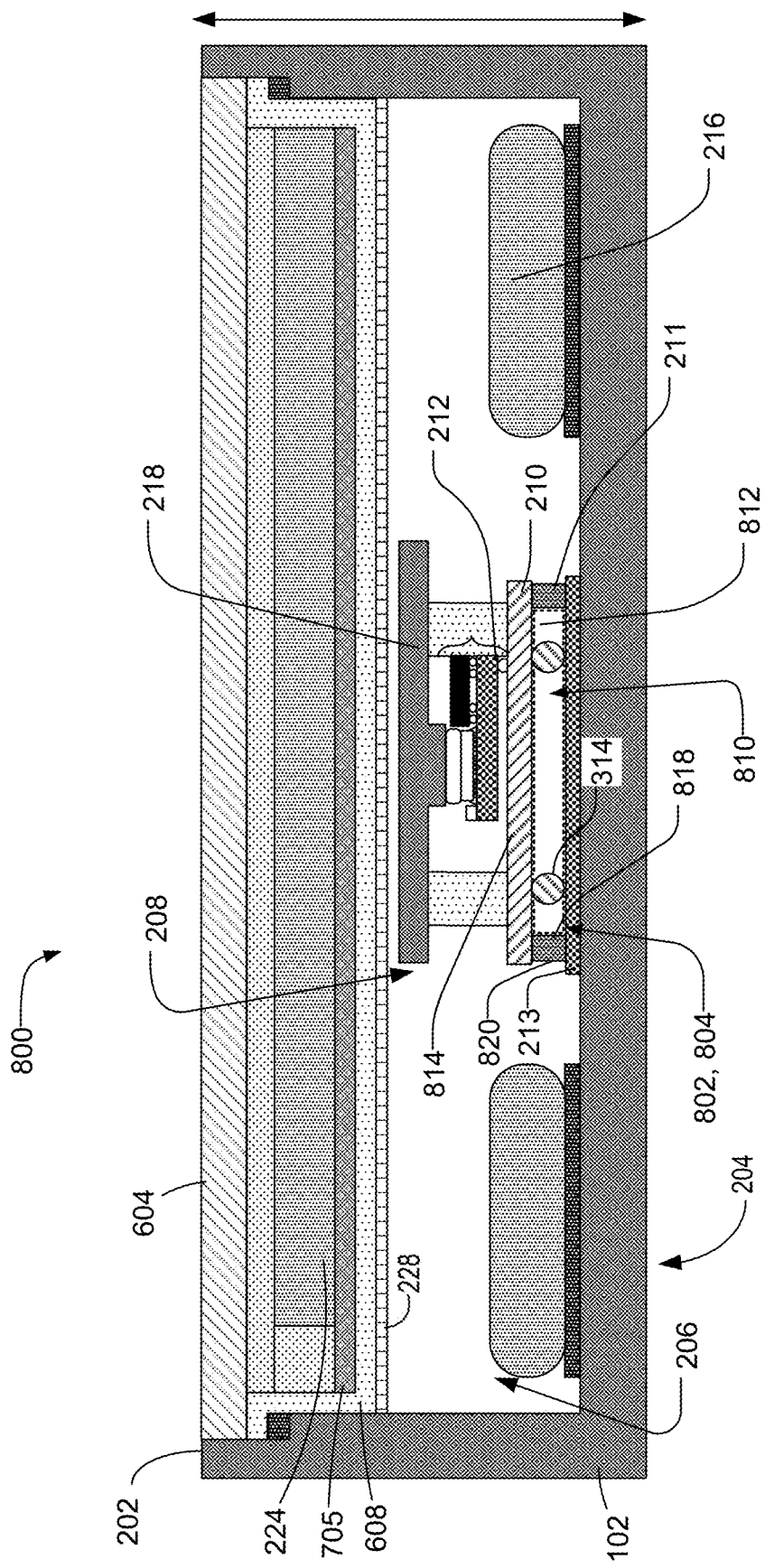
FIG. 8 is a cross-sectional view of another example electronic device disclosed herein.

FIG. 8 is a cross-sectional side view of the example electronic device 800 having the example thermal management system 802 disclosed herein. In the illustrated example, the thermal management system 802 includes an insulation layer 804 provided in a system component assembly 208 (e.g., a printed circuit board (PCB) 210, a semiconductor package 212 (e.g., a system on chip (SOS), a heat sink or heat spreader 218) of the electronic device 800. The insulation layer 804 of the illustrated example is formed between the PCB 210 and the skin 204. Specifically, the PCB 210, a ring backplate 211, and a heat spreader 213 define a vacuum chamber 810 (e.g., schematically represented by the rectangular dashed line in FIG. 8). For example, the heat spreader 213 can be a graphite layer or structure (e.g., a plate) that couples the ring backplate 211 and the PCB 210 to the skin 204 (e.g., an aluminum chassis). Specifically, a first surface 812 of the PCB 210 opposite a second surface 814 that is oriented toward the heat spreader 218, a first surface 816 of the heat spreader 213 is oriented toward the first surface 812 of the PCB 210, and an inner surface 818 of the ring backplate 211 opposite a second surface 820 oriented toward the frame 202 (e.g., the battery packs 216) define the vacuum chamber 810. To provide a vacuum, the PCB 210 and ring backplate 211 interface is sealed around an entire perimeter of the interface. Similarly, a substantial portion of a perimeter of the ring backplate 211 and the heat spreader 213 is sealed and a portion is unsealed. A vacuum is drawn in the vacuum chamber 810 through the unsealed portion of the ring backplate 211 and the heat spreader 213 interface. After the vacuum is drawn, the unsealed portion is sealed to provide a fully sealed vacuum chamber. In the illustrated example, one or more spacers 314 can be positioned in the vacuum chamber 810 to provide structural support to the PCB 210 and/or the heat spreader 213. In operation, the thermal management system 802 provides a passively cooled system, (e.g., solely) heat conduction and/or radiation is occurred due to lack of air, which reduces skin temperature of the skin 204, the frame 202, a glass cover 604 and/or other components and/or the housing 102. In some examples, a low thermal conductivity gas is provided in the vacuum chamber 810 instead of a vacuum. In some examples, a thickness gap or height (e.g., in the z-direction or vertical direction in the orientation of FIG. 8) of the between the interface layer 808 and the PCB 210 is approximately 0.3 millimeters. In the illustrated example, a heat shield 228 is coupled to the display back plate 608 and positioned between the display back plate 608 and the heat spreader 218. In the illustrated example, the electronic device 800 includes the layer 705 (e.g., the layer 705 of FIG. 7).

FIG. 9A is a cross-sectional side view of the example electronic device 900 having another example thermal management system 902 disclosed herein. FIG. 9B is a perspective view of the example thermal management system 902 of FIG. 9A. Referring to FIGS. 9A and 9B, the thermal management system 902 includes an insulation layer 904 provided in a system component assembly 208 (e.g., a printed circuit board (PCB) 210, a semiconductor package 212 (e.g., a system on chip (SOS), a heat sink or heat spreader 218) of the electronic device 900. The insulation layer 904 of the illustrated example is positioned between the PCB 210 and a heat spreader 213. The insulation layer 904 of the illustrated example is defined by a vacuum pad 906 (e.g., a vacuum pod). The vacuum pad 906 includes a housing 908 (e.g., an enclosed rectangular housing) having an upper surface 910, a lower surface 912 and side surfaces 914 to define a vacuum chamber 916. In other words, referring to FIG. 8, the vacuum pad 906 defines or replaces the vacuum chamber 810. After manufacturing or formation of the vacuum pad 906, a vacuum is drawn in the vacuum pad 906 prior to installing with the system component assembly 208. In other words, the vacuum pad 906 is a pre-fabricated component that is an additional hardware provided in the system component assembly 208. Thus, the vacuum pad 906 is provided to the manufacturer during assembly of the system component assembly 208. In this manner, the vacuum pad 906 facilitates manufacturing of the system component assembly 208 and/or the electronic device 900. In some examples, the vacuum pad 906 and/or the vacuum chamber 916 can be filled with a low thermally conductive gas instead of a vacuum. In some examples, the housing 908 includes a port or valve (e.g., the port 312) to enable a vacuum to be drawn in the vacuum chamber 916 or enable a gas to be provided in the vacuum chamber 916. In the illustrated example, the electronic device 900 includes the layer 705 (e.g., the layer 705 of FIG. 7).

Figure 10A:
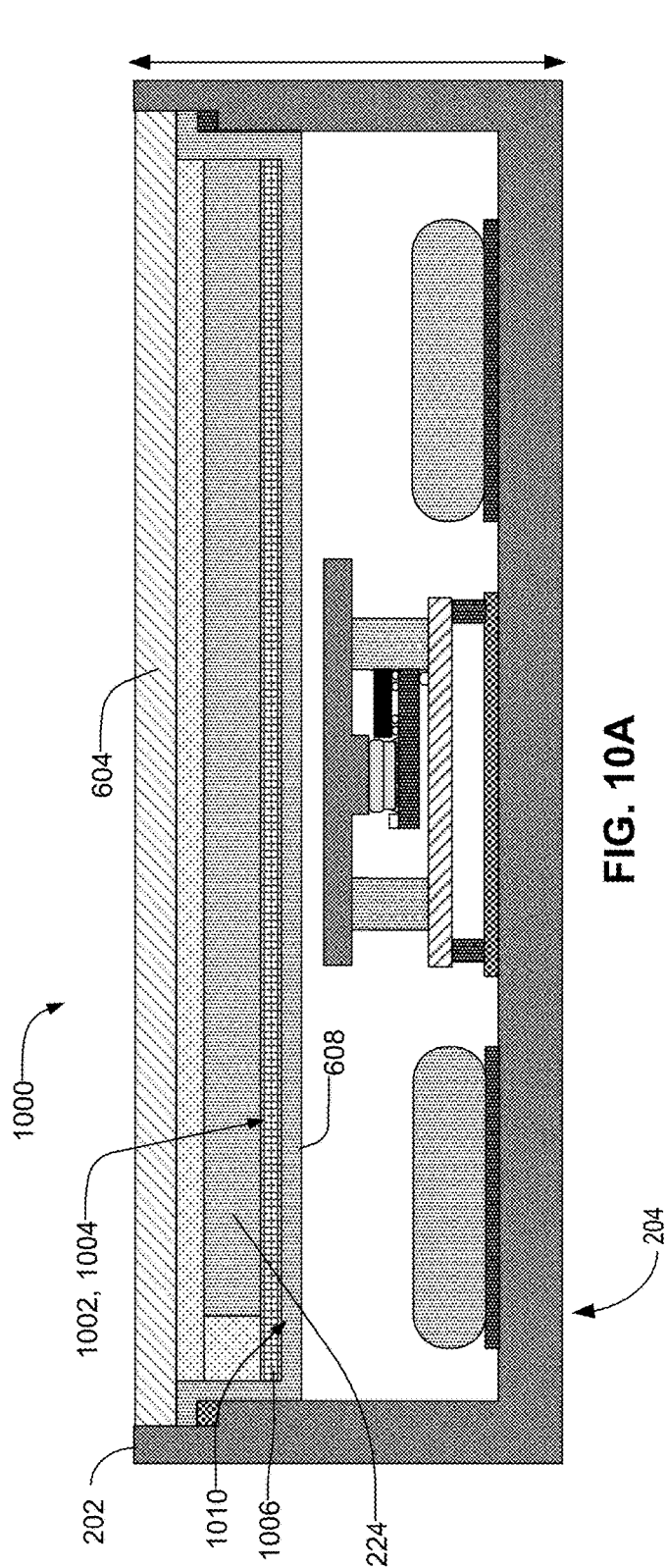
FIG. 10A is a cross-sectional view of another example electronic device disclosed herein.
Figure 10B:
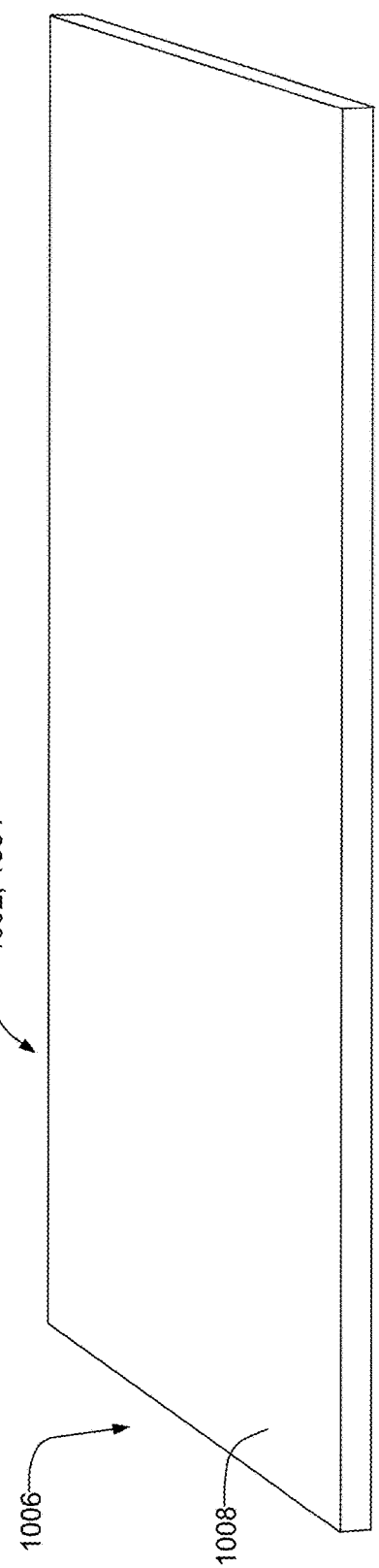
FIG. 10B is a perspective view of another example thermal management system of the example electronic device of FIG. 10A.

FIG. 10A is a cross-sectional side view of another example electronic device 1000 having another example thermal management system 1002 disclosed herein. FIG. 10B is a perspective view of the example thermal management system 1002 of FIG. 10A. Referring to FIGS. 10A and 10B, the thermal management system 1002 includes an insulation layer 1004 provided between a display 224 and a display back plate 608. The insulation layer 1004 of the illustrated example is defined by a vacuum pad 1006 (e.g., a vacuum pod). The vacuum pad 1006 includes a housing 1008 (e.g., an enclosed rectangular housing) having walls to define a vacuum chamber 1010. In other words, referring to FIG. 6, the vacuum pad 1006 defines or replaces the vacuum chamber 616. After manufacturing or formation of the vacuum pad 1006, a vacuum is drawn in the vacuum chamber 1010 of the vacuum pad 1006 prior to installing with the electronic device 1000 (e.g., prior to assembly or positioning between the display 224 and the display back plate 608). In other words, the vacuum pad 1006 is a pre-fabricated component. Thus, the vacuum pad 1006 is provided to the manufacturer during assembly of the electronic device 1000. In this manner, the vacuum pad 1006 facilitates manufacturing of the system component assembly 208 and/or the electronic device 1000. In some examples, the vacuum pad 1006 and/or the vacuum chamber 1010 can be filled with a low thermally conductive gas instead of a vacuum. In some examples, the housing 1008 includes a port or valve (e.g., the port 312) to enable a vacuum to be drawn in the vacuum chamber 1010 or enable a gas to be provided in the vacuum chamber 1010. In some examples, the vacuum pad 1006 can be positioned between the glass cover 604 and the display 224. In some examples, a first vacuum pad (e.g., the vacuum pad 1006) can be positioned between the display 224 and the display back plate 608 and a second vacuum pad (e.g., another vacuum pad 1006) can be positioned between the glass cover 604 and the display 224. In some such examples, both the first vacuum pad and the second vacuum pad include a vacuum. In some such examples, both the first vacuum pad and the second vacuum pad include a gas. In some such examples, the first vacuum pad includes a vacuum and the second vacuum pad include a gas.

Figure 11:
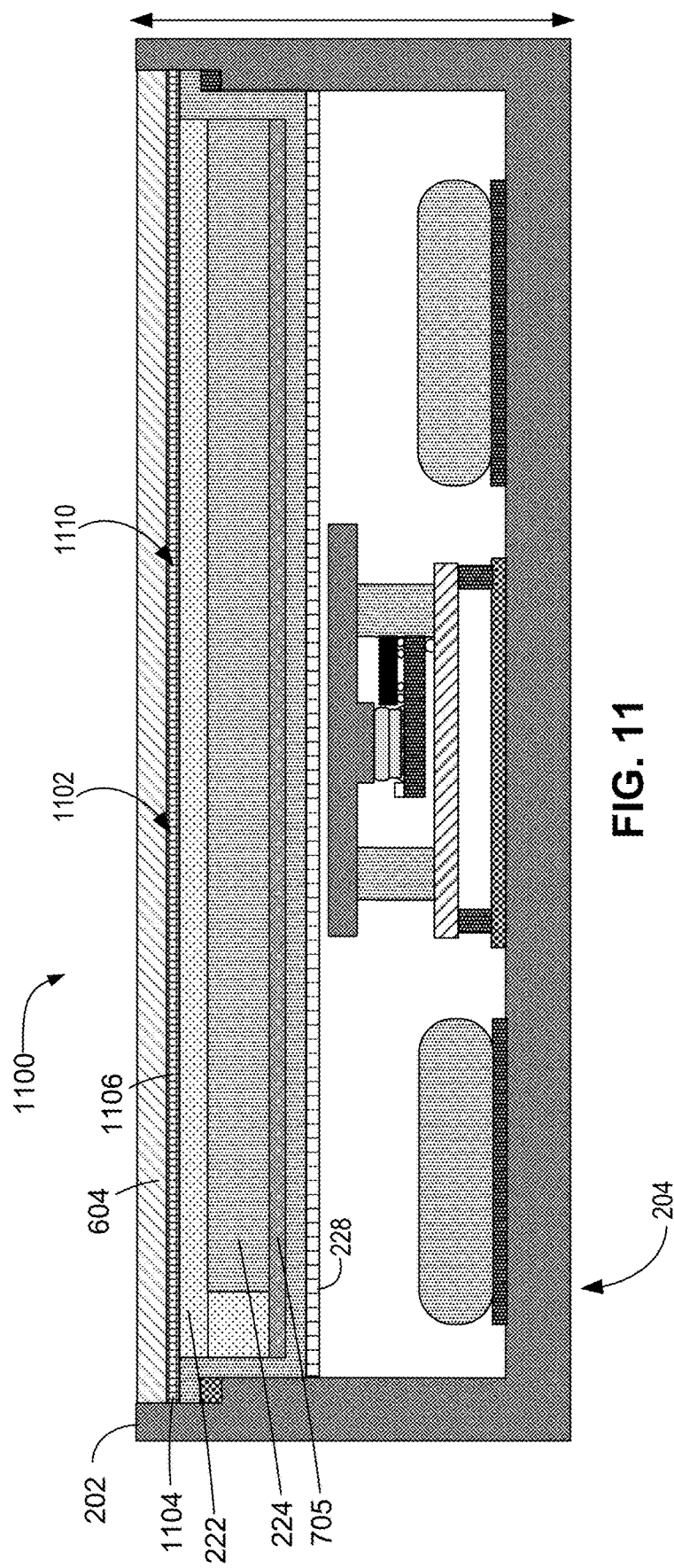
FIG. 11 is a cross-sectional view of another example electronic device disclosed herein.

FIG. 11 is a cross-sectional side view of another example electronic device 1100 having another example thermal management system 1102 disclosed herein. The thermal management system 1102 of this example includes an insulation layer 1104 provided between a display 224 and a glass cover 604. The insulation layer 1104 of the illustrated example is defined by a vacuum pad 1106 (e.g., a vacuum pod, the vacuum pad 1006 of FIGS. 10A, 10B). The vacuum pad 1106 defines a chamber 1110 that can have a vacuum or a low thermal conductivity gas. In the illustrated example, the electronic device 1100 includes the layer 705 (e.g., the layer 705 of FIG. 7).

Figure 12:
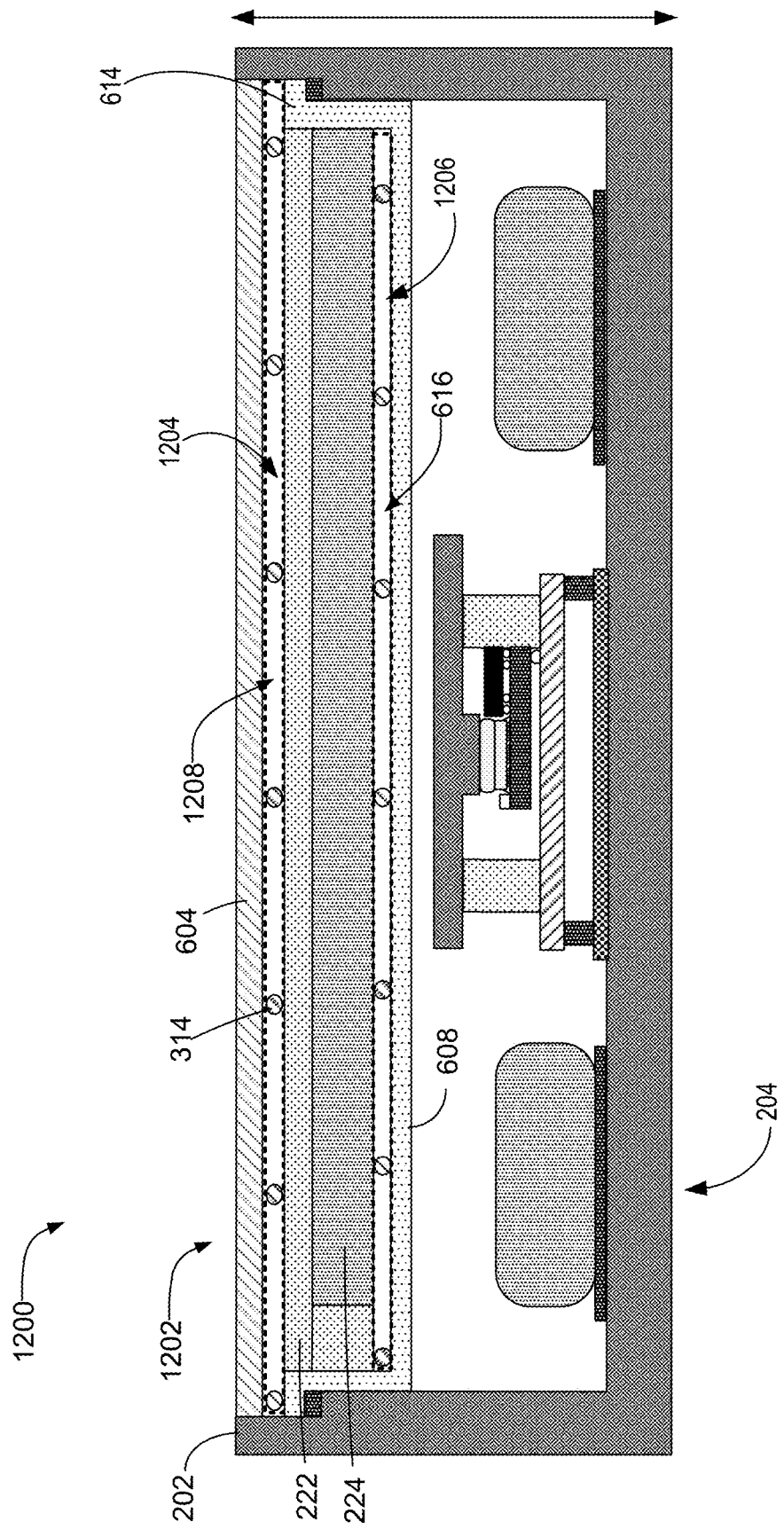
FIG. 12 is a cross-sectional view of another example electronic device disclosed herein.

FIG. 12 is a cross-sectional side view of another example electronic device 1200 having another example thermal management system 1202 disclosed herein. The thermal management system 1202 includes a first insulation layer 1204 and a second insulation layer 1206. The first insulation layer 1204 is between a glass cover 604 and a display 224. The first insulation layer 1204 of the illustrated example is defined by a first vacuum chamber 1208 (e.g., schematically represented by a dashed rectangular line). In the illustrated example, the OCA 222, a flange 614 of a display back plate 608 and the glass cover 604 define the vacuum chamber 1208. For example, a perimeter of the first insulation layer 1204 can be sealed between the glass cover 604, the OCA 222, the flange 614 and the housing 202. In other words, a first surface of the glass cover 604 oriented toward the display 224, a first surface of the display 224 and/or the OCA 222 oriented toward the first surface of the glass cover 604, a first surface of the flange 614 oriented toward the glass cover 604, and a side surface of the housing 202 between the first surface of the flange 614 and the first surface of the glass cover 604 define the first vacuum chamber 1208. To provide support to the display 224 and/or the OCA 222, the first insulation layer 1204 includes a plurality of spacers 314 (e.g., disposed in the vacuum chamber 1208). The second insulation layer 1206 is substantially similar or identical to the insulation layer 606 of FIG. 6. For example, the second insulation layer 1206 is between the display 224 and the display back plate 608. The display 224 and the display back plate 608 form or define a vacuum chamber 616 between the display 224 and the display back plate 608 (e.g., schematically represented by a dashed rectangular line). To provide support to the display 224 and/or the display back plate 608, the insulation layer 606 includes a plurality of spacers 314 (e.g., disposed in the vacuum chamber 616). In some examples, the electronic device 1200 of FIG. 12 does not include the second insulation layer 1206.

The foregoing examples of the electronic devices 100, 600, 700, 800, 900, 1000, 1100 and 1200, the thermal management systems 200, 602, 702, 802, 902, 1002, 1102 and 1202, the insulation layers 234, 606, 704, 804, 904, 1004, 1104, 1204, 1206 and/or other components disclosed herein can be employed with an electronic device and/or a thermal management system. Although each example electronic device 100, 600, 700, 800, 900, 1000, 1100 and 1200, the thermal management system 200, 602, 702, 802, 902, 1002, 1102 and 12022, the insulation layer 606, 704, 804, 904, 1004, 1104, 1204, 1206 and/or other components disclosed above have certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. For example, an example electronic device disclosed herein can include one or more combinations of the insulation layer 234 provided by the thermal management system 200 and/or the glass cover 220 of FIG. 2, the example insulation layer 606 provided by the thermal management system 602 of FIG. 6, the insulation layer 704 provided by the thermal management system 702 of FIG. 7, the insulation layer 804 provided by the thermal management system 802 of FIG. 8, the insulation layer 904 provided by the thermal management system 902 of FIGS. 9A and 9B, the insulation layer 1004 provided by the thermal management system 1002 of FIGS. 10A and 10B, the insulation layer 1104 provided by the thermal management system 1102 of FIG. 11 and/or the first insulation layer 1204 and/or the second insulation layer 1206 provided by the thermal management system 1202 of FIG. 12. Additionally, in some examples, both a first vacuum chamber or vacuum pad positioned in an electronic device and a second vacuum chamber or vacuum pad positioned in the electronic device include a vacuum. In some examples, both a first vacuum chamber or vacuum pad positioned in an electronic device and a second vacuum chamber or vacuum pad positioned in the electronic device include a gas. In some examples, a first vacuum chamber or vacuum pad positioned in an electronic device includes a vacuum and a second vacuum chamber or vacuum pad positioned in the electronic device includes a gas.

In some examples, the insulation layers 234, 606, 704, 804, 904, 1004, 1104, 1204, 1206 provide means for insulating (e.g., an electronic device) or means for restricting or preventing heat transfer. In some examples, the glass covers 220, 604 provide means for covering a display. In some examples, the display assembly 104 and/or the display 224 provides means for displaying, means for providing a user input, and/or means for presenting information. In some examples, the spacers 314 provide means for supporting. In some examples, the vapor chambers 306, 616, 706, 810, 916, 1010, 1110, 1208 provide means for providing a vacuum, means for defining a chamber, means for storing a gas, or means for storing a vacuum. In some examples, the housing 102, 104, the frame 202 or the skin 204 provide means for providing a housing and/or means for defining a cavity. In some examples, the heat spreader 218 provides means for spreading heat.

Example methods, apparatus, systems, and articles of manufacture to provide thermal insulations for electronic devices are disclosed herein. Further examples and combinations thereof include the following:

Example 1 includes an electronic device having a housing defining a cavity, electronics in the cavity, and a touch display over the electronics. A heat spreader has a first surface toward the electronics and a second surface opposite the first surface toward the touch display, where the heat spreader is to dissipate heat generated by the electronics. A glass cover is coupled to the housing and has a first side toward the touch display and a second side opposite the first side, where the glass cover is exposed external to the housing. An insulation layer is between the second surface of the heat spreader and the second side of the glass cover to restrict heat transfer from the electronics to the second side of the glass cover.

Example 2 includes the electronic device of example 1, where the insulation layer is defined by a vacuum chamber between the first side and the second side of the glass cover.

Example 3 includes the electronic component of any one of the examples 1 and 2, where the glass cover includes support structures in the vacuum chamber of the glass cover.

Example 4 includes the electronic component of any one of the examples 1-3, where the insulation layer is between the display and a display heat shield, the display heat shield between the electronics and the display.

Example 5 includes the electronic component of any one of the examples 1-4, where the insulation layer is a vacuum pad.

Example 6 includes the electronic component of any one of the examples 1-5, where the vacuum pad includes a vacuum chamber.

Example 7 includes the electronic component of any one of the examples 1-6, where the insulation layer defines a vacuum chamber having a pressure that is less than atmospheric pressure.

Example 8 includes the electronic component of any one of the examples 1-7, where the insulation layer includes a gas-filled chamber.

Example 9 includes the electronic component of any one of the examples 1-8, where the gas-filled chamber includes at least one of argon, nitrous oxide, carbon dioxide, krypton, or xenon.

Example 10 includes an electronic device having a housing and a glass cover supported by the housing. The glass cover includes a first glass, a second glass spaced from the first glass, and an edge seal between the first glass and the second glass. The first glass, the second glass and the edge seal define a chamber between the first glass and the second glass.

Example 11 includes the electronic device of example 10, further including a plurality of spacers in the chamber between the first glass and the second glass.

Example 12 includes the electronic device of any one of examples 10-11, further including a port in at least one of the first glass or the second glass to enable fluidic access to the chamber.

Example 13 includes the electronic device of any one of examples 10-12, where a pressure of the chamber is less than atmospheric pressure.

Example 14 includes the electronic device of any one of examples 10-13, where the chamber includes gas.

Example 15 includes the electronic device of any one of examples 10-14, where the edge seal is along perimeter edges of the first glass and the second glass.

Example 16 includes an electronic device having a housing defining a cavity, a semiconductor package, a heat spreader, the heat spreader to dissipate heat generated by the semiconductor package, one or more displays, a display heat shield between the semiconductor package and at least one of the one or more displays, and a glass cover over at least one of the one or more displays, the glass cover including an insulation layer to reduce heat generated by the semiconductor package from spreading to the glass cover.

Example 17 includes the electronic device of example 16, where the insulation layer has an internal pressure that is less than atmospheric pressure.

Example 18 includes the electronic device of any one of examples 16-17, where the insulation layer includes a low thermal conductivity gas.

Example 19 includes the electronic device of any one of examples 16-18, where the glass cover includes: a first glass; a second glass spaced from the first glass; and an edge seal around a perimeter of the first glass and a perimeter of the second glass to define a vacuum chamber between the first glass and the second glass.

Example 20 includes the electronic device of any one of examples 16-19, further including spacers in the chamber to support at least one of the first glass or the second glass when less than atmospheric pressure is present in the chamber.

Example 21 includes the electronic device of any one of examples 16-20, where an air gap is provided between the semiconductor package and the display heat shield.

Example 22 includes the electronic device of any one of examples 16-21, where the air gap is less than approximately 0.4 millimeters and an overall thickness of the housing is less than approximately 6.5 millimeters.

Example 23 includes an electronic device having a housing defining a cavity, a touch display, a display back plate in the cavity adjacent the touch display, a semiconductor package between the display back plate and the housing, and an insulation layer within the cavity between the housing and the display back plate.

Example 24 includes the electronic device of example 23, where the insulation layer has an internal volume with an internal pressure less than atmospheric pressure.

Example 25 includes the electronic device of any one of examples 23-24, where the insulation layer includes at least one of argon, nitrous oxide, carbon dioxide, krypton, or xenon.

Example 26 includes the electronic device of any one of examples 23-25, where the cavity of the housing is sealed between the display back plate oriented toward the semiconductor package and walls of the housing.

Example 27 includes an electronic device having a first heat spreader, a circuit board, a semiconductor package between the first heat spreader and the circuit board, a ring plate, and a second heat spreader, where the ring plate is between the circuit board and the second heat spreader. An insulation layer is between the circuit board, the ring plate, and the second heat spreader. The insulation layer has at least one of an internal pressure less than an atmospheric pressure or a gas.

Example 28 includes the electronic device of example 27, where the insulation layer is a chamber between a first side of the circuit board and an inner surface of the ring plate. Example 29 includes the electronic device of any one of examples 27-28, where the insulation layer is a vacuum pad.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed:

1. An electronic device comprising:
   a housing defining a cavity;
   electronics in the cavity;
   a display over the electronics;
   a heat spreader having a first surface toward the electronics and a second surface opposite the first surface toward the display, the heat spreader to dissipate heat generated by the electronics;
   a glass cover coupled to the housing and having a first side toward the display and a second side opposite the first side, the glass cover exposed externally to the housing; and
   an insulation layer between the second surface of the heat spreader and the second side of the glass cover to restrict heat transfer from the electronics to the second side of the glass cover.

2. The electronic device of claim 1, wherein the insulation layer is defined by a vacuum chamber between the first side and the second side of the glass cover.

3. The electronic device of claim 2, wherein the glass cover includes support structures in the vacuum chamber of the glass cover.

4. The electronic device of claim 1, wherein the insulation layer is between the display and a display heat shield, the display heat shield between the electronics and the display.

5. The electronic device of claim 1, wherein the insulation layer is a vacuum pad.

6. The electronic device of claim 5, wherein the vacuum pad includes a vacuum chamber.

7. The electronic device of claim 1, wherein the insulation layer defines a vacuum chamber having a pressure that is less than atmospheric pressure.

8. The electronic device of claim 1, wherein the insulation layer includes a gas-filled chamber.

9. The electronic device of claim 8, wherein the gas-filled chamber includes at least one of argon, nitrous oxide, carbon dioxide, krypton, or xenon.

10. An electronic device comprising:
    a housing defining a cavity;
    a semiconductor package;
    a heat spreader, the heat spreader to dissipate heat generated by the semiconductor package;
    one or more displays;
    a display heat shield between the semiconductor package and at least one of the one or more displays; and
    a glass cover over at least one of the one or more displays, the glass cover including an insulation layer to reduce heat generated by the semiconductor package from spreading to the glass cover.

11. The electronic device of claim 10, wherein the insulation layer has an internal pressure that is less than atmospheric pressure.

12. The electronic device of claim 10, wherein the insulation layer includes a low thermal conductivity gas.

13. The electronic device of claim 10, wherein the glass cover includes:
    a first glass;
    a second glass spaced from the first glass; and an edge seal around a perimeter of the first glass and a perimeter of the second glass to define a chamber between the first glass and the second glass.

14. The electronic device of claim 13, including spacers in the chamber to support at least one of the first glass or the second glass when less than atmospheric pressure is present in the chamber.

15. The electronic device of claim 10, wherein an air gap is provided between the semiconductor package and the display heat shield.

16. The electronic device of claim 15, wherein the air gap is less than approximately 0.4 millimeters and an overall thickness of the housing is less than approximately 6.5 millimeters.

17. An electronic device comprising:
a first heat spreader;
a circuit board;
a semiconductor package between the first heat spreader and the circuit board;
a ring plate;
a second heat spreader, the ring plate between the circuit board and the second heat spreader; and
an insulation layer between the circuit board, the ring plate, and the second heat spreader, the insulation layer having an internal pressure less than an atmospheric pressure.

18. The electronic device of claim 17, wherein the insulation layer includes a gas.

19. The electronic device as defined in claim 17, wherein the insulation layer is a chamber between a first side of the circuit board and an inner surface of the ring plate.

20. The electronic device as defined in claim 19, including a plurality of spacers in the chamber.

21. The electronic device as defined in claim 17, wherein the insulation layer is a vacuum pad.

* * * * *